United States Patent [19]

Hartung et al.

[11] Patent Number: 4,815,263

[45] Date of Patent: Mar. 28, 1989

[54] AIRBORNE TREE TRIMMING APPARATUS

[76] Inventors: Joe Hartung, 52 Robin Dr., Ventress, La. 70783; William C. Cox, III, 2016 Shadowood Ct., Columbia, S.C. 29212

[21] Appl. No.: 197,025

[22] Filed: May 20, 1988

[51] Int. Cl.⁴ ............................................. A01D 55/18
[52] U.S. Cl. ........................................ 56/235; 56/11.9; 144/2 Z
[58] Field of Search ......................... 30/206, 207, 240; 144/2 Z, 3 D, 343; 56/DIG. 9, 11.9, 23 S; 83/478

[56] References Cited

U.S. PATENT DOCUMENTS 2,707,008 4/1955 Bannister ............................. 144/2 Z
4,554,781 11/1985 Rogers .................................. 56/11.9
4,577,457 3/1986 Grant .................................... 56/23 S

*Primary Examiner*—W. Donald Bray
*Attorney, Agent, or Firm*—John M. Harrison

[57] ABSTRACT

An airborne tree trimming apparatus for installation on a helicopter or the like, and operating independently of the helicopter, which apparatus includes a boom extension vertically suspended from the helicopter and a plurality of circular saw blades arranged in tandem, coplanar relationship on an operating boom which is attached to the boom extension by means of a boom pivot. The circular saw blades are designed to rotate about parallel, substantially horizontal axes which are oriented substantially at right angles to the normal direction of motion of the helicopter and are belt-driven by an internal combustion engine which is also mounted on the operating boom, above the circular saw blades. A pair of ground-located cradles not attached to the operating boom, permit the apparatus to be landed with the operating boom elevated from ground level, by maneuvering the helicopter to lay the operating boom and circular saw blades on the cradles in front of the helicopter. An optional quick-release hook engaging the top of the boom structure and mounted on the helicopter permits the apparatus to be jettisoned in an emergency while the helicopter is airborne.

33 Claims, 3 Drawing Sheets

U.S. Patent  Mar. 28, 1989  Sheet 1 of 3  4,815,263
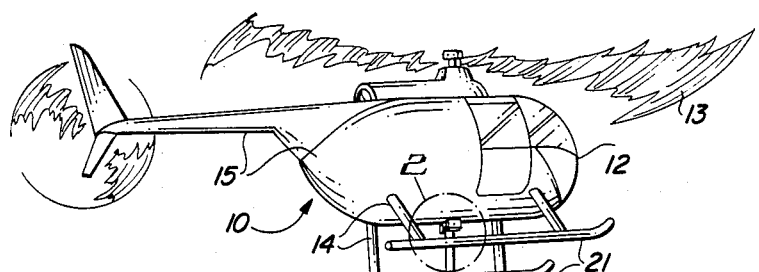
FIG-1
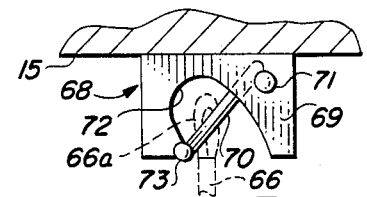
FIG-2
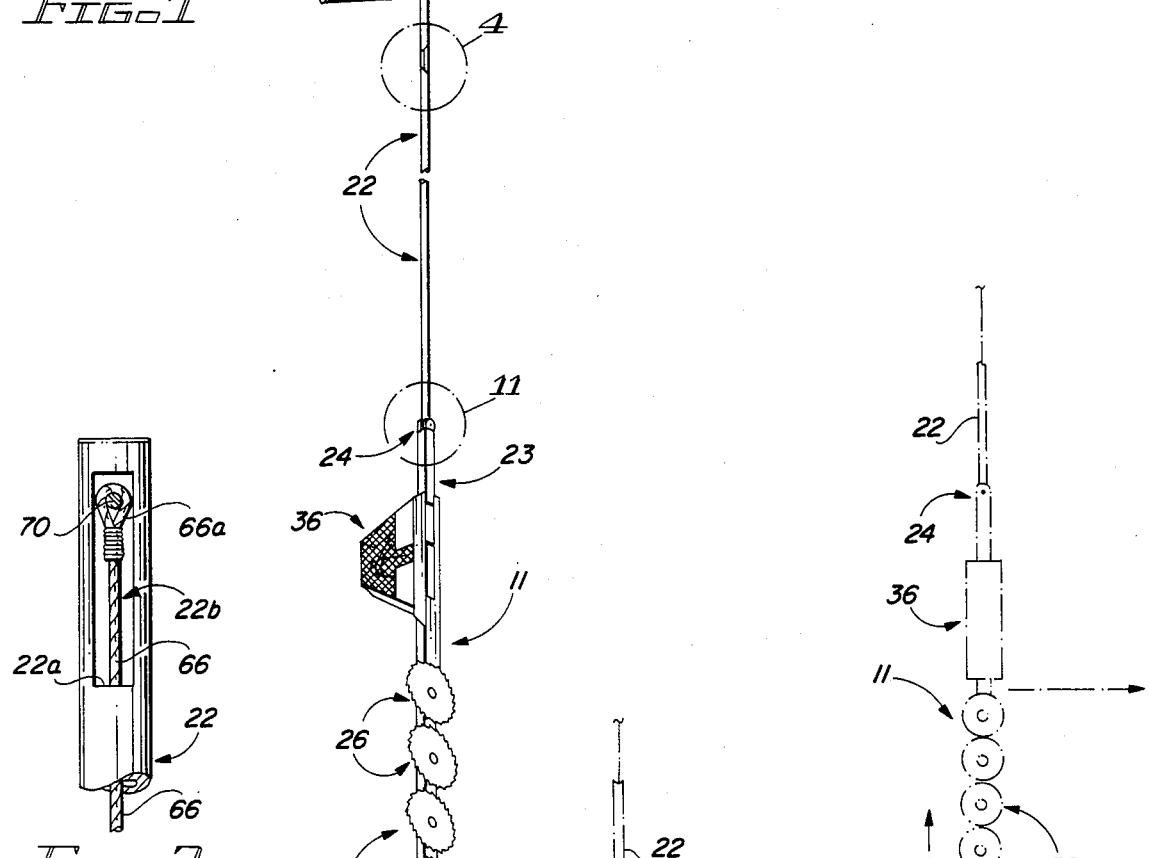
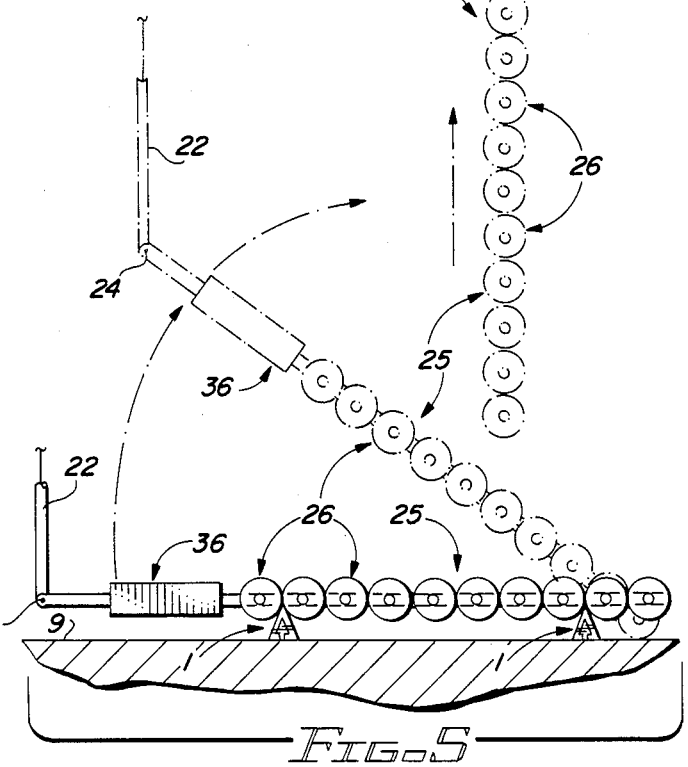
FIG-5
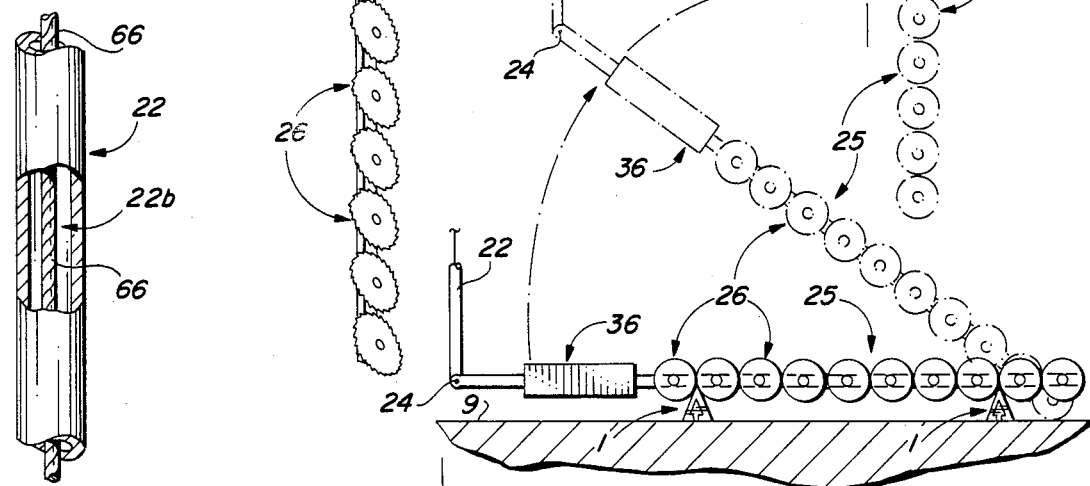
FIG-3
FIG-4

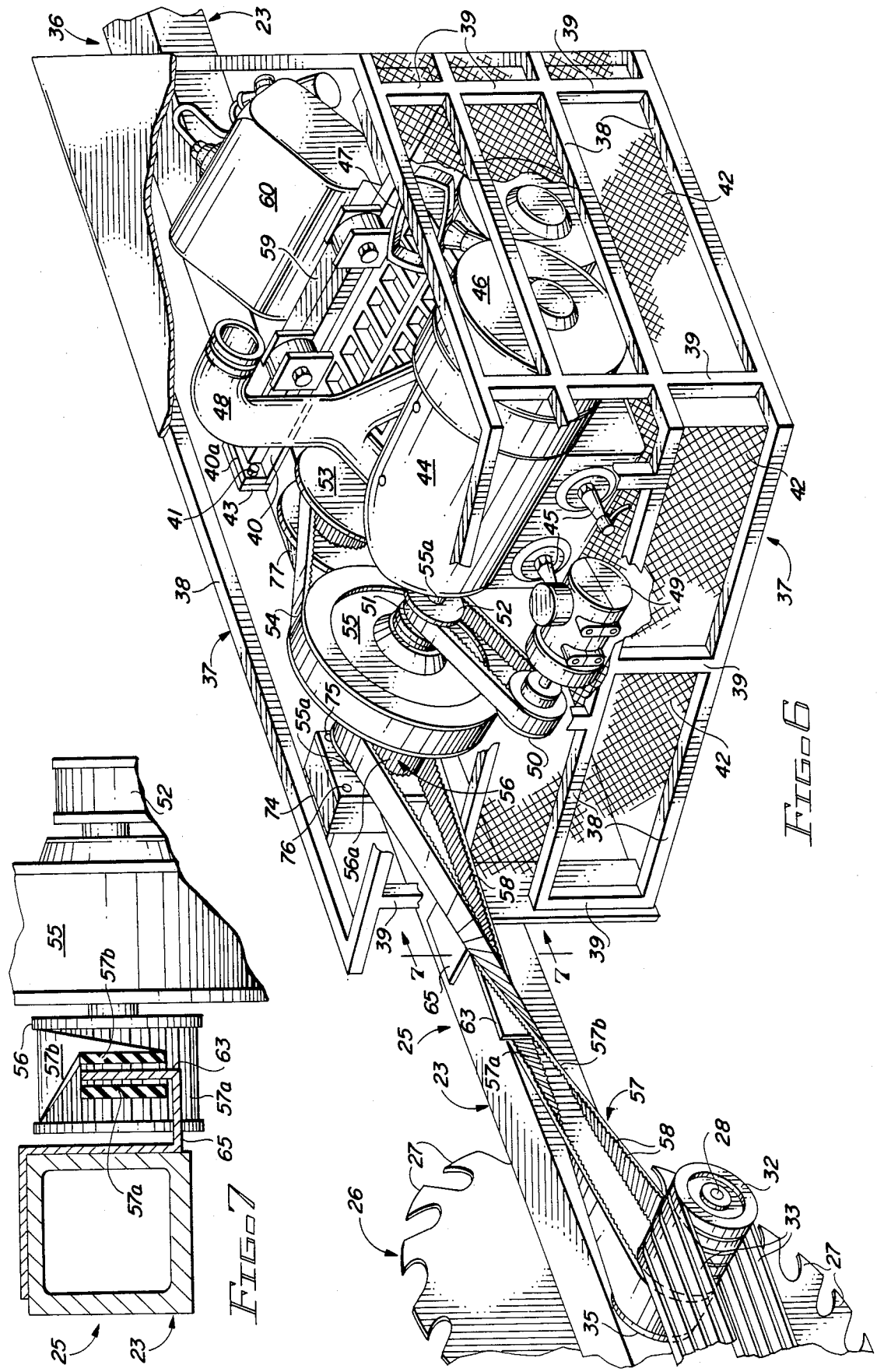

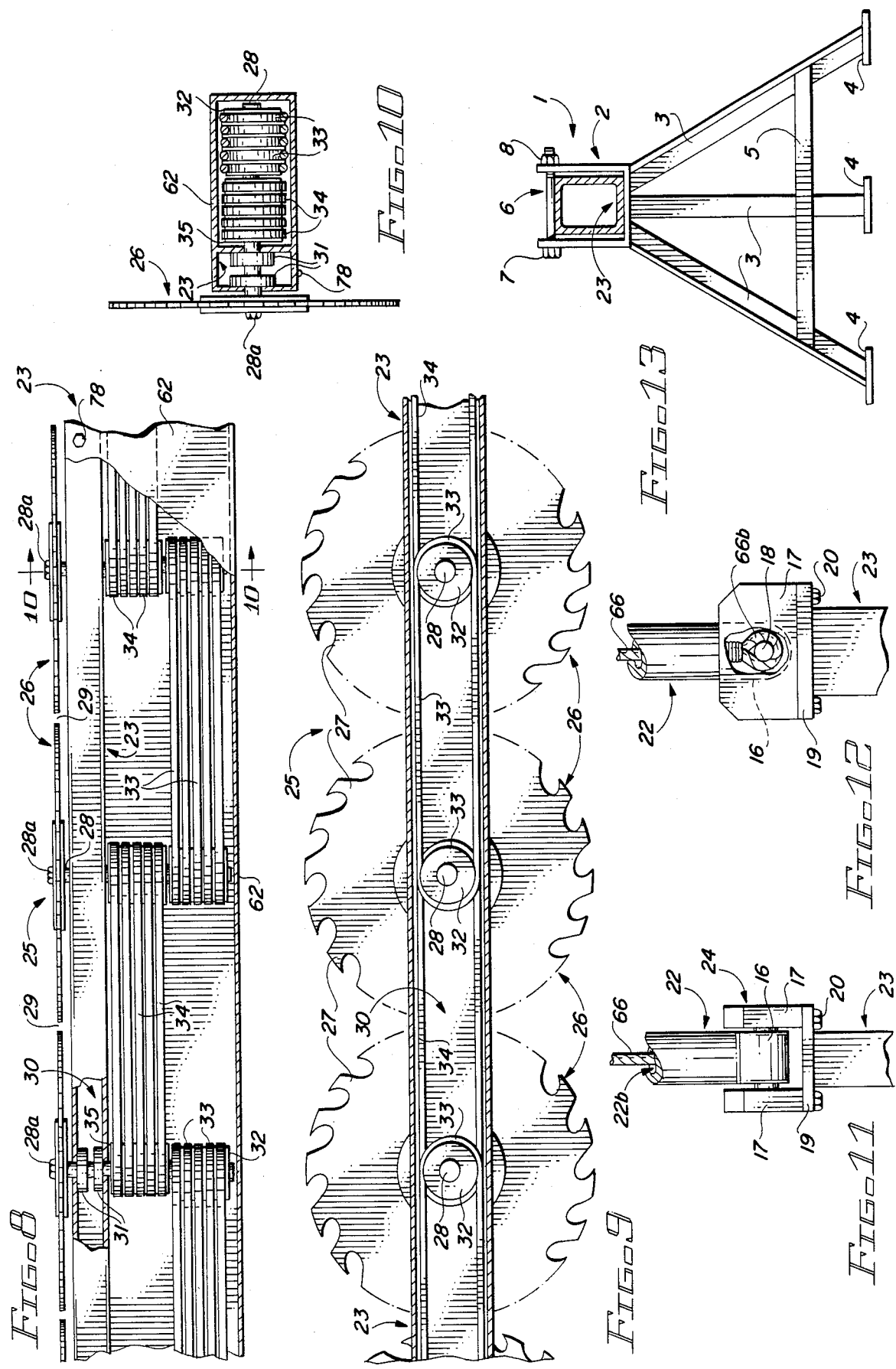

AIRBORNE TREE TRIMMING APPARATUS

BACKGROUND OF THE INVENTION

1. Field of the Invention

This invention relates to tree trimming apparatus which is especially suitable for trimming rights-of-way adjacent to electric power lines at a selected distance from the ground. In a preferred embodiment, the apparatus is airborne and includes an articulated boom for suspension beneath a helicopter undercarriage, with ten or more rotating circular saw blades mounted in coplanar, closely spaced, tandem relationship on the boom. The circular saw blades are powered by an internal combustion engine mounted on a drive, or engine section assembly of the boom and are linked to the engine by specially designed Gates "polychain" belts. The circular saw blades extend about ten inches out from the boom structure and thus permit the cutting of large tree branches which are six to eight inches or more in diameter, as well as smaller woody growth.

The boom-mounted circular saw blades rotate in a vertical plane when operational, with all blades oriented outwardly of the supporting boom. The blades each rotate on a separate shaft which is cantilever-mounted in the boom, such that the outside surfaces of the blades are located in a common plane. Accordingly, as the helicopter passes along the edge of a row of trees to be cut, the circular saw blades are always oriented on the tree side of the boom and are adapted to engage and cut the branches through. The severed branches then fall away on the boom side of the tree trimming apparatus. The articulated boom may be constructed of multiple sections, each section carrying one or more rotatable, belt-driven circular saw blades and the saw-carrying boom sections may be reversed top to bottom on the ground, in order to move the blades to the desired cutting side of the helicopter. However, in a preferred embodiment of the invention, ten circular saw blades are rotatably mounted on the bottom 20 feet of a single 30 foot boom, while the top 6 feet of the boom receives the engine assembly. In the absence of a significant tail-wind, the usual operational practice is to fly the helicopter along one side of a power line, trimming the tree branches and woody growth at a selected height for several miles and return in the opposite direction to cut the branches and woody growth on the opposite side, without shifting the circular saw blades from right to left.

When using a tree trimming apparatus having ten circular saw blades, each having a diameter of about two feet, the engine used to drive the blades should be capable of operating the blades at approximately 2300 to 2500 rpm. The inertia of the circular saw blades is a very significant factor in the cutting efficiency thereof, and due to the relatively great total weight and large blade diameter of these tandem-mounted blades, this factor aids in cutting tree branches of both small and large diameter.

It should be noted that the pivotal mounting of the articulated boom in the airborne tree trimming apparatus about a transverse axis which is substantially perpendicular to the direction of motion of the helicopter, not only aids in take-off and landing of the apparatus, but also permits the apparatus to yield slightly to the rear when encountering numerous or large branches during airborne operation. Thus, while the helicopter speed may be five to ten feet per second, the forward cutting speed of the circular saw blades through very large branches along a flight path beneath the helicopter may be somewhat less than this speed. The greater the average speed which is attainable for the helicopter at effective cutting rates, the more cost-effective the clearing operation will be.

The problem of encroachment of trees and other woody growth in power line rights-of-way and other locations which need to be kept free of trees and brush has been commonly solved with ground or air-applied herbicides. Helicopters have long played a large and important role in spraying herbicides to prevent the encroachment of trees and plants on such rights-of-way. However, the spraying of herbicides for woody growth control is sometimes undesirable, particularly during windy weather, since the herbicide is sometimes blown from the rights-of-way onto adjacent crops and animals. The alternative of cutting encroaching tree branches and other woody growth by use of ground vehicles or on foot has proved to be very expensive and time-consuming, particularly in remote areas.

2. Description of the Prior Art

The use of multiple, airborne, hydraulically-operated circular saw blades mounted on a boom for use in trimming trees along power line rights-of-way is detailed in U.S. Pat. No. 4,554,781, dated Nov. 26, 1985, to Randall Rogers. A ground-operated apparatus for trimming trees in orchards and in like applications is detailed in U.S. Pat. No. 4,067,178, dated Jan. 10, 1978, to Charles Miller. While perhaps suitable for use in the orderly environment of a fruit orchard, such ground vehicle-mounted apparatus is of limited use in trimming trees adjacent to electric utility rights-of-way in rural and remote areas. Furthermore, the apparatus such as that detailed in U.S. Pat. No. 4,067,178 is clearly not adaptable for mounting on a helicopter or other aircraft. A number of other patents disclose multiple circular saw blades for tree trimming purposes, the most pertinent of which patents are listed below. These patents detail non-coplanar, circular saw blades which are used in controlled, ground vehicle-supported tree trimming operations:

| U.S. Pat. No. | Patentee | Date Issued |
|---|---|---|
| 3,487,615 | C. O. Leydig, et al | April 1, 1968 |
| 3,913,304 | Paul Jodoin | October 21, 1975 |
| 3,952,485 | L. R. McRobert | April 27, 1976 |
| 4,302,922 | H. F. Guerndt Jr., et al | December 1, 1981 |

The present invention permits rapid and accurate trimming of trees adjacent to electric utility and other rights-of-way in a safe and efficient manner. The trimming height of the tandem array of airborne, engine-driven, coplanar circular saw blades may be forty feet or more, with the use of twenty blades in each array. The circular saw blades are designed to complement each other and to cause one blade to continue a cutting which is begun by an adjacent blade, where necessary in cutting large limbs. In use, an articulated boom carrying the tandem-mounted circular saw blades and attached to a helicopter will slope slightly rearwardly from the attachment point at the helicopter and from the articulated joint along a flight path beneath the helicopter, so that very small branches and woody growth cannot pass between any two adjacent blades without being cut. A primary factor in the cutting efficiency of these circular saw blades is the combined great weight and large size of the blades, which aggregation of mass creates a momentum or impetus which equals the product of the mass and the rotational velocity of the blades and greatly enhances the blade cutting efficiency. Take-off and landing with the apparatus is a simple matter for a qualified helicopter pilot due to the front-to-rear articulation of the operating boom with respect to the boom extension, permitting the apparatus to be laid out on a pair of ground-supported cradle supports beneath the helicopter at take-off or landing.

In addition to providing the above described features and advantages, it is an object of this invention to provide a self-contained tree trimming apparatus for suspension from, and towing by a helicopter and characterized by a downward-hanging boom carrying a plurality of adjacent, internal combustion engine-powered circular saw blades arranged in tandem to provide a cutting path or swath in woody growth, of from about twenty to about fifty feet in height along a predetermined flight path.

It is another object of the invention to provide a helicopter-mounted tree trimming apparatus fitted with multiple, internal combustion engine-driven circular saw blades mounted in tandem, substantially coplanar relationship on a substantially vertical, articulated boom. The boom is mounted on the helicopter to prevent substantial rotation about its longitudinal axis and is articulated to permit pivoting in a vertical plane beneath the helicopter, which vertical plane substantially bisects the flight path of the helicopter.

Yet another object of this invention is to provide an airborne tree trimming apparatus which is fitted with a governor controlled internal combustion engine and multiple circular saw blades located on one end of an articulated operating boom, the blades being connected by a system of belts to the engine, wherein a quick release hook attached to the helicopter supports the top end of the boom and a safety cable extending through the boom and permits the apparatus to be jettisoned from the helicopter in an emergency.

Still another object of the invention is to provide a self-contained, helicopter-mounted tree trimming apparatus which is capable of operating independently of the helicopter and is provided with multiple circular saw blades arranged in tandem on a substantially vertical operating boom and powered by a governor-controlled internal combustion engine also mounted on the operating boom above the circular saw blades, the circular saw blades being sufficiently large and heavy to generate significant momentum and inertia for optimum cutting efficiency.

SUMMARY OF THE INVENTION

These and other objects of the invention are provided in an elongated boom adapted for pivotal, substantially non-rotatable and releasible suspension from a helicopter, a governor-controlled internal combustion engine mounted on the boom and multiple circular saw blades rotatably mounted on the boom in closely spaced, tandem, co-planar relationship in belt-driven association with the engine, which blades are sufficiently large and massive to generate substantial momentum and inertia for optimum cutting of woody growth.

Other objects and advantages of this invention will be apparent from consideration of the following description in conjunction with the appended drawings, wherein:

FIG. 1 is a side elevational view of a preferred embodiment of the airborne tree trimming apparatus of this invention in functional, airborne configuration;

FIG. 2 is a side view of a release hook for suspending the apparatus illustrated in FIG. 1 from the helicopter;

FIG. 3 is an enlarged view, partially in section, of the top end of the support boom illustrated in FIG. 1;

FIG. 4 is an enlarged view, partially in section, of an upper section of the support boom illustrated in FIG. 1;

FIG. 5 is a side view of the preferred lifting sequence for lifting the airborne tree trimming apparatus illustrated in FIG. 1 from a position of rest;

FIG. 6 is a perspective view of a typical engine mounted on the supporting boom and adapted for driving the circular saw blades;

FIG. 7 is a sectional view taken along line 7—7 of the drive belt illustrated in FIG. 6;

FIG. 8 is an end sectional view of the blade-supporting end of the supporting boom;

FIG. 9 is a rear view, partially in section, of the blade-supporting end of the boom illustrated in FIG. 8;

FIG. 10 is a sectional view taken along line 10—10 of the blade-supporting end of the support boom illustrated in FIG. 8;

FIG. 11 is a front view of a preferred boom pivot;

FIG. 12 is a side view of the boom pivot illustrated in FIG. 11; and

FIG. 13 is a sectional view of one end of one of two companion cradles for locating and supporting the airborne tree trimming apparatus on the ground.

DESCRIPTION OF THE PREFERRED EMBODIMENTS

Referring initially to FIGS. 1, 2 and 5 of the drawings, a helicopter 10 is illustrated with the airborne tree trimming apparatus 11 suspended beneath the helicopter 10. As illustrated in FIG. 5, the airborne tree trimming apparatus 11 is illustrated in a first position in stored configuration engaging the cradle supports 1. The steps of lifting the airborne tree trimming apparatus 11 from the cradle supports 1 to the functional position illustrated in FIG. 1 are illustrated in phantom in FIG. 5. While a helicopter 10 is normally used to elevate and operate the airborne tree trimming apparatus 11, it will be understood and appreciated by those skilled in the art that any aircraft which is capable of hovering may act as a support vehicle for operation of the airborne tree trimming apparatus 11. The helicopter 10 is conventional in design and is typically equipped with a single main rotor 13, although the helicopter 10 may also be equipped with multiple rotors, according to the knowledge of those skilled in the art. A fuselage 15 extends from the bubble canopy 12 and conventional landing skids 21 are attached to the fuselage 15 by means of four struts 14. The helicopter 10 should be typically capable of lifting a payload ranging from 1000 to 1500 lbs. or more and may be fitted with a standard cargo hook. However, in a preferred embodiment, one end of a boom extension 22 is attached to the fuselage 15 of the helicopter 10 by means of a quick-release hook 68, which is detailed in FIG. 2, and the boom extension 22 extends downwardly beneath the helicopter 10 and terminates at a boom pivot 24. The quick-release hook 68 is designed to facilitate release of the airborne tree trimming apparatus 11 in an emergency, as hereinafter further described. One end of an operating boom 23 is pivotally attached to the opposite end of the boom extension 22 at the boom pivot 24 to facilitate resting of the cutting section 25 and the drive section 36 of the operating boom 23 on the cradle supports 1, as illustrated in phantom in FIG. 5. The boom pivot 24 further facilitates lifting the cutting section 25 and the drive section 36 of the operating boom 23 upwardly to the operational configuration illustrated in FIG. 1, as illustrated by the arrows in FIG. 5.

Further as illustrated in FIG. 1 and referring also to FIGS. 11 and 12, the boom pivot 24 facilitates pivotal movement of the operating boom 23 both forwardly and rearwardly in a plane extending through the longitudinal plane and flight path of the helicopter 10 and parallel to the circular saw blades 26, located in the cutting section 25, during operation of the airborne tree trimming apparatus 11, as hereinafter further described. As further illustrated in FIGS. 11 and 12, in a most preferred embodiment of the invention the boom pivot 24 is characterized by a boom extension knuckle 16 shaped in the extending end of the boom extension 22 and adapted to fit between a pair of boom pivot flanges 17, which are bolted to a coupling plate 19 by means of coupling plate bolts 20. The coupling plate 19 is, in turn, welded or otherwise fixedly attached to one end of the operating boom 23 to facilitate rigid attachment of the operating boom 23 to the parallel boom pivot flanges 17. A boom pivot pin 18 extends through opposed openings (not illustrated) provided in the boom pivot flanges 17 and through a corresponding and registering opening (not illustrated) provided in the boom extension knuckle 16, in order to pivotally secure the boom extension knuckle 16 and the boom extension 22 to the boom pivot flanges 17 and the operating boom 23.

Referring again to FIGS. 1-4 of the drawings, it will be appreciated that the top end of the boom extension 22 which is attached to the fuselage 15 of the helicopter 10 is most preferably attached thereto in longitudinally-hinged or pivotal relationship by means of the quick-release coupling or hook 68, to facilitate release of the boom extension 22 when the operating boom 23 is resting on the cradle supports 1 or under emergency circumstances, when the helicopter 10 must be freed of the airborne tree trimming apparatus 11 during operation. In a most preferred embodiment of the invention, the quick-release hook 68 is characterized by a hook housing 69, which is secured to the bottom area of the fuselage 15, and includes a curved hook slot 72. A keeper 70 is pivotally mounted in the hook slot 72 by means of a keeper hinge 73 and a keeper pin 71 extends through the hook housing 69 to retain the keeper 70 in secured position, as illustrated in FIG. 2. The keeper 70 thus serves to mount the top end of the boom extension 22 to the fuselage 15 and an automatic release mechanism (not illustrated) is normally attached to the keeper pin 71 for releasing the keeper pin 71 from the helicopter 10, in an emergency. As illustrated in FIGS. 3 and 4, the boom extension 22 is provided with an extension slot 22a, which extends through opposite walls of the boom extension 22 and communicates with the longitudinal bore 22b of the boom extension 22. In a preferred embodiment of the invention, a safety cable 66 extends through the bore 22b from connection at one end by means of a bottom cable loop 66b to the boom pivot pin 18, to a top cable loop 66a, which loops over the keeper 70, as the keeper 70 extends through the extension slot 22a, to mount the boom extension 22 on the quick-release hook 68. Regardless of the specific design of the quick-release hook 68 or alternative coupling apparatus which is used to secure the boom extension 22 to the fuselage 15 of the helicopter 10, the circular saw blades 26 must be located in a plane which is substantially parallel to a plane which bisects the longitudinal axis of the helicopter 10, in order to face and maintain the cutting edges of the circular saw blades 26 in the direction of travel of the helicopter 10, against tree limbs and woody growth extending into a right-of way to be cleared. Furthermore, it is understood that the operating boom 23 of the airborne tree trimming apparatus 11 is normally disposed in angular relationship with respect to the boom extension 22, both due to the pivoting or hinged function of the boom extension 22 with the helicopter 10 and by operation of the boom pivot 24, as the helicopter 10 is flown along the right-of-way and the circular saw blades 26 contact tree limbs and other woody growth during the cutting operation.

Referring now to FIGS. 1, 6 and 8-10 of the drawings, in a preferred embodiment of the invention the operating boom 23 is characterized by a cutting section 25, which rotatably receives multiple circular saw blades 26 in tandem, each of which circular saw blades 26 is fitted with multiple saw teeth 27 on the periphery thereof and is mounted on a central blade shaft 28 by means of a shaft nut 28a. Each blade shaft 28 is journalled for spaced rotation in the operating boom 23 and receives a front belt pulley 35 and a rear belt pulley 32, as illustrated in FIGS. 6, 8 and 10. Each of the circular saw blades 26 is also mounted in a common plane, with a small blade clearance 29 provided between the respective saw teeth 27 of adjacent companion circular saw blades 26. In a most preferred embodiment of the invention, each of the circular saw blades 26 is about two feet in diameter and weigh about 15 pounds each and a total of 10 rotating circular saw blades 26 are used in each cutting section 25 of the operating boom 23. However, it will be appreciated by those skilled in the art that an alternative number of circular saw blades 26 of selected diameter can be used in each cutting section 25, where multiple cutting sections 25 of the airborne tree trimming apparatus 11 are used, as desired. As further illustrated in FIG. 8 of the drawings, a pair of shaft spacers 31, located in the boom cavity 30, are mounted in spaced relationship on the blade shaft 28 which receives each of the circular saw blades 26, in order to securely and rotatably mount each blade shaft 28 in the operating boom 23. Furthermore, five sets of parallel rear belts 33 are fitted to the rear belt pulleys 32, respectively, and five sets of companion, parallel front belts 34 are mounted on the front belt pulleys 35, respectively, in alternating, paired relationship, in order to provide a drive system for operating the respective circular saw blades 26. As illustrated in FIG. 6, the front belt pulley 35 which services the circular saw blade 26 that is located closest to the drive section 36 of the operating boom 23, is fitted with a drive belt 57, for cooperating with the internal combustion engine 44 and driving the system of rear belt pulleys 32 and front belt pulleys 35, as hereinafter further described. A U-shaped belt shroud 62 is bolted to the cutting section 25 of the operating boom 23 by means of shroud bolts 78, as illustrated in FIG. 10, in order to shield the rear belts 33 and the front belts 34 from entanglement with severed tree limbs and woody growth while operating the airborne tree trimming apparatus 11.

Referring again to FIGS. 1, 5 and 13 of the drawings, in a most preferred embodiment of the invention the parallel, spaced cradle supports 1, designed for receiving and supporting the airborne tree trimming apparatus 11, are each further characterized by a boom seat 2 which is shaped to receive and support the operating boom 23, as illustrated in FIG. 1. The boom seat 2 is supported by three seat legs 3, arranged in a triangular configuration, with the attached spaced feet 4 adapted to rest on the ground 9 and secure the cradle supports 1 thereon. Leg braces 5 serve to brace the spaced seat legs 3 in the triangular configuration, in order to more securely support the operating boom 23. A keeper bolt 6, having a keeper bolt head 7, is designed to extend through matched openings (not illustrated) provided in the top edges of the boom seat 2, in order to threadibly receive a keeper bolt nut 8 and secure the operating boom 23 in the boom seat 2 when the airborne tree trimming apparatus 11 is not in use.

Referring now to FIGS. 1, 6 and 7 of the drawings, in another most preferred embodiment of the invention the drive section 36 of the operating boom 23 is characterized by an engine frame 37 fitted with guard rails 38, cooperating rail braces 39 and a wire mesh or expanded metal shield 42. The engine frame 37 is secured to the drive section 36 of the operating boom 23 by means of boom brackets 40, to each of which are welded or otherwise attached a corresponding boom bracket plate 40a and companion boom bracket bolts 41, which secure a keeper plate 43 to the corresponding boom bracket plate 40a, as illustrated in FIG. 6. An internal combustion engine 44 is bolted or otherwise fixedly secured to the drive section 36 of the operating boom 23 and the engine frame 37 and a drive pulley 53, provided with a clutch 77, is attached to the crankshaft (not illustrated) of the internal combustion engine 44. The drive pulley 53 is oriented in alignment with an idler pulley 55, rotatably mounted on an idler pulley shaft 55a, which is secured to a pulley mount bracket 74 by means of a cooperating bracket plate 75 and bracket bolts 76 and the drive pulley 53 and idler pulley 55 are connected to each other by a drive pulley belt 54. The internal combustion engine 44 is also fitted with conventional spark plugs 45 and a rewind apparatus 46, which receives a starter rope (not illustrated), terminated by a starter handle 47, for starting the internal combustion engine 44. An exhaust manifold 48 projects from the internal combustion engine 44 and a governor 49 is mounted to the engine frame 37 and is fitted with a governor pulley 50, which is provided in alignment with a governor belt pulley 52, secured to the idler pulley shaft 55a. A governor belt 51 connects the governor belt pulley 52 and the governor pulley 50. The governor 49 is also coupled to the throttle (not illustrated) of the internal combustion engine 44, in order to control the operational speed of the internal combustion engine 44 and the circular saw blades 26, as hereinafter further described.

Referring again to FIGS. 6 and 7 of the drawings and as heretofore described, the drive belt 57 is looped around the front belt pulley 35 which serves the circular saw blade 26 that is closest to the drive section 36 of the operating boom 23. The opposite end of the drive belt 57 is looped around a companion drive belt pulley 56, which is attached to the idler pulley shaft 55a, to which the idler pulley 55 is mounted. Accordingly, rotation of the drive pulley 53 effects a corresponding rotation of the idler pulley 55 by operation of the drive pulley belt 54 and rotation of the idler pulley shaft 55a and the companion drive belt pulley 56, along with the drive belt 57 and the front belt pulley 35. In a most preferred embodiment of the invention, the drive belt pulley 56 is provided with pulley cogs 56a, for engaging the drive belt teeth 58 in the drive belt 57. If the internal combustion engine 44 is designed for drive shaft operation in the counterclockwise direction as viewed from the rear, the drive pulley belt 54 and drive belt 57 can be conventionally mounted to drive the circular saw blades 26 in the same direction. However, when the internal combustion engine 44 is designed for drive shaft operation in the clockwise direction as illustrated in FIG. 6, then the drive belt 57 must be twisted and mounted as illustrated. As further illustrated in FIGS. 6 and 7, under these circumstances, a slip plate 63 is mounted to the operating boom 23 by means of a cooperating slip plate bracket 65, which extends from fixed attachment to the operating boom 23. The slip plate 63 projects between the top segment 57a and the bottom segment 57b of the drive belt 57, respectively. This twisted orientation of the top segment 57a and bottom segment 57b with respect to the slip plate 63 effects reverse rotation of the circular saw blades 26 in the counterclockwise direction, as indicated by the arrow as viewed from the rear in FIG. 6 and separates the facing drive belt teeth 58, as the drive belt 57 rotates.

Referring again to FIG. 6 of the drawings, a drive section bar 59 is provided in the engine frame 37 to divide the internal combustion engine 44 from the fuel tank 60. A fuel line 61 connects the fuel tank 62 to the carburetor (not illustrated) of the internal combustion engine 44, in order to continuously supply fuel from the fuel tank 60 to the internal combustion engine 44.

Referring again to FIG. 1 of the drawings, it will be appreciated that when the airborne tree trimming apparatus 11 is operated, tree branches (not illustrated) which are cut by the rotating circular saw blades 26 will fall away from the operating boom 23, in order not to interfere with the drive section 36 of the operating boom 23. Under normal operating circumstances, the airborne tree trimming apparatus 11 is suspended beneath the helicopter 10 while the helicopter 10 makes a single pass along each side of a power line right-of-way. Accordingly, an airborne tree trimming apparatus 11 having any desired number of circular saw blades 26 may be utilized, although for simplicity, ten circular saw blades 26 is preferred. However, as heretofore noted, it is understood that the operating boom 23 can be modular in design, such that additional cutting sections 25 can be bolted together or otherwise joined, as desired, in order to extend the effective length of the cutting section 25 to accommodate a desired number of circular saw blades 26. It is further understood that the internal combustion engine 44 must be sized and designed to provide sufficient power to drive a desired number of cutting sections 25 which may be added to the operating boom 23, in order to achieve the desired cutting goals. In a typical airborne tree trimming apparatus 11 the internal combustion engine 44 is characterized by a two-stroke "Rotex" snowmobile engine having 40 horsepower and capable of operating at speeds up to about 6000 rpm. However, it will be recognized that other power plants of suitable horsepower can also be used, according to the knowledge of those skilled in the art. Under circumstances where trees are encountered with limbs to be cut which are higher from the ground than the total length of the cutting section 25, then multiple passes may be made by the helicopter 10 at different altitudes, in order to engage and cut these limbs. Under normal operating conditions the first pass is used to cut the highest tree branches to a clearance which is somewhat closer to the tree than might normally be required and the second pass operates to cut the lower tree branches or woody growth, with the boom extension 22 then provided with sufficient clearance to move through the area formerly occupied by the upper limbs.

As further illustrated in FIGS. 1 and 5, when the airborne tree trimming apparatus 11 is to be used, the boom extension 22 is initially mounted to the quick-release hook 68, attached to the fuselage 15 of the helicopter 10 and the extending end of the boom extension 22 is then coupled to the operating boom 23 at the boom pivot 24 by inserting the boom pivot pin 18 through the aligned openings provided in the boom extension knuckle 16 and the boom pivot flanges 17, while the helicopter 10 hovers above. The internal combustion engine 44 is then started by grasping the starter handle 47 and operating the rewind apparatus 46 manually. This starting operation is facilitated by manipulating an engine operating switch (not illustrated) in the helicopter 10 into the "idle" configuration, to disengage the clutch 77. The keeper nuts 8 are then are removed from each of the keeper bolts 6 which extend through the boom seats 2 and the cradle supports 1 and the keeper bolts 6 are removed, in order to facilitate lifting the operating boom 23 from the boom seats 2, as illustrated in FIG. 5. The airborne tree trimming apparatus 11 is then ready for use in clearing a power line or alternative right-of-way, as illustrated in FIG. 1. Replacement of the airborne tree trimming apparatus 11 back on the respective cradle supports 1 is assisted by a person on the ground while the helicopter 10 is flown rearwardly after contact is made with one of the cradle supports 1 by the cutting section 25 of the operating boom 22, as further illustrated in FIG. 5. During airborne operation, the internal combustion engine 44 is operated at a relatively low speed by the governor 49 under "no load" conditions before the cutting operation begins, by maintaining the engine operating switch in the "idle" position. When cutting begins, the engine operating switch is moved into the "run" position, which engages the clutch 77 and facilitates rotation of the circular saw blades 26 in concert. The governor 49 monitors the speed of the idler pulley 55 and thus, the circular saw blades 26 and maintains a relatively low engine rpm until the circular saw blades 26 contact woody growth, when the governor 49 senses the load and increases the engine speed. The governor therefore controls the engine to restore lost engine speed during the cutting operation. An engine "kill" switch (not illustrated) is also provided in the helicopter 10, in order to terminate operation of the internal combustion engine 44, as desired.

From the foregoing description and explanation it will be seen that the airborne tree trimming apparatus of this invention provides a highly effective and economical mechanism and tool for rapidly trimming trees of substantially any size and location, as well as brush and other woody growth which encroaches or threatens to encroach on electrical power line or other utility rights-of-way. The apparatus is particularly useful in those cases where overland access by ground vehicle to the rights-of-way in question requires the approval of landowners or is inconvenient or impossible and it may be operated independently of the carrying helicopter. The apparatus according to this invention may also be used to rapidly complete other jobs such as trimming backfire brakes, pipeline rights-of-way, security strips and maintain other cleared areas that are threatened with encroachment by brush, trees and woody growth.

Referring again to FIGS. 6 and 8-10, it will be appreciated that the circular saw blades 26 should always rotate such that the saw teeth 27 initially engage the woody growth in a downward direction, in order to uplift the helicopter 10, rather than pull it downwardly. Accordingly, as heretofore described, the airborne tree trimming apparatus is characterized by convenient versatility, in that the drive belt 57 can be either conventionally mounted or mounted in twisted relationship as illustrated in FIG. 6, to achieve this objective, as described above. It will be further appreciated that various alternative drive configurations for the drive belt 57 can be used in order to drive the circular saw blades 26. For example, the drive belt 57 can be attached at the drive end directly to the drive pulley 53, rather than to the drive belt pulley 56 as illustrated in FIG. 6. Furthermore, the governor 49 can be connected directly to the drive shaft (not illustrated) of the internal combustion engine 44 by means of the governor belt pulley 52 and governor belt 51 if desired, it being only necessary to monitor the engine speed in order to maintain the necessary engine speed for cutting the woody growth by operation of the governor 49. Additionally, the rear belts 33 and front belts 34 which connect the rear belt pulleys 32 and the front belt pulleys 35, respectively, can be replaced by a single belt, respectively, having sufficient friction and utilizing companion belt pulleys of corresponding design to operate the circular saw blades 26. Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. Airborne tree trimming apparatus for installation on a helicopter or the like, comprising boom means carried by said helicopter and extending downwardly from said helicopter; an internal combustion engine mounted on said boom means; blade means mounted on said boom means beneath said internal combustion engine; and power transmission means connecting said internal combustion engine and said blade means in driving relationship, whereby said blade means operates to cut and trim woody growth along a flight path beneath the helicopter or the like responsive to operation of said internal combustion engine.

2. Apparatus as recited in claim 1 wherein said blade means further comprises at least one circular saw blade rotatably mounted on said boom means.

3. Apparatus as recited in claim 2 wherein said at least one circular saw blade further comprises a plurality of circular saw blades rotatably mounted on said boom means in substantially coplanar, tandem relationship.

4. Apparatus as recited in claim 1 further comprising a boom pivot provided in said boom means between said helicopter and said internal combustion engine and wherein said boom means further comprises a boom extension projecting from said boom pivot to said helicopter and an operating boom extending from said boom pivot to said blade means.

5. Apparatus as recited in claim 4 wherein said blade means further comprises a plurality of circular saw blades rotatably mounted on said operating boom in substantially coplanar, tandem relationship.

6. Apparatus as recited in claim 4 wherein said boom extension extends downwardly substantially from the center of lift of the helicopter.

7. Apparatus as recited in claim 1 further comprising a quick-release hook carried by the helicopter for engaging said boom means, said quick-release hook remotely controlled from the helicopter for selectively separating said boom means from the helicopter and jettisoning said airborne tree trimming apparatus.

8. Apparatus as recited in claim 1 wherein said power transmission means further comprises drive pulley means provided in driving relationship on said internal combustion engine, at least one driven pulley means carried by said blade means and at least one drive belt engaging said drive pulley means and said driven pulley means.

9. Apparatus as recited in claim 3 wherein said power transmission means further comprises a drive pulley provided in driving relationship on said engine; a plurality of driven pulleys carried by said circular saw blades, respectively; a plurality of connecting belts connecting said driven pulleys to each other, respectively; and a drive belt engaging said drive pulley and one of said driven pulleys for driving said driven pulleys and said circular saw blades, respectively; and further comprising:

(a) a boom pivot provided in said boom means between said helicopter and said internal combustion engine and wherein said boom means further comprises a boom extension projecting from said boom pivot to said helicopter and an operating boom extending from said boom pivot to said circular saw blades; and (b) a quick-release hook carried by the helicopter for engaging said boom extension, said quick-release hook remotely controlled from the helicopter for selectively separating said boom extension from the helicopter and jettisoning said airborne tree trimming apparatus.

10. Apparatus as recited in claim 9 wherein said boom extension extends downwardly substantially from the center of lift of the helicopter.

11. Airborne tree trimming apparatus for installation on a helicopter or the like and cutting woody growth beneath the helicopter along the flight path of the helicopter, said apparatus comprising a boom extension having one end attached to said helicopter substantially at the center of lift of the helicopter, said boom extension being restrained from substantial rotation about the longitudinal axis thereof; a boom pivot provided on the opposite end of said boom extension; an operating boom extending from said boom pivot in substantially coplanar pivoting relationship with respect to said boom extension; a plurality of circular saw blades mounted in tandem on said operating boom for rotation substantially in a common plane, said circular saw blades oriented in close proximity to each other; an internal combustion engine fixedly carried by said operating boom between said boom pivot and said circular saw blades; and power transmission means connecting said internal combustion engine to said circular saw blades, for rotating said circular saw blades in concert and cutting the woody growth responsive to airborne operation of the helicopter and said internal combustion engine.

12. Apparatus as recited in claim 11 wherein said circular saw blades further comprise at least five circular saw blades.

13. Apparatus as recited in claim 11 wherein said boom pivot is adapted to facilitate articulation of said operating boom with respect to said boom extension substantially in a plane which extends through the longitudinal axis of the helicopter and the flight path.

14. Apparatus as recited in claim 12 wherein said circular saw blades are each about two feet in diameter.

15. Apparatus as recited in claim 11 further comprising a quick-release hook carried by the helicopter for engaging said boom extension, said quick-release hook remotely controlled from the helicopter for selectively separating said boom extension from the helicopter and jettisoning said airborne tree trimming apparatus.

16. Apparatus as recited in claim 11 wherein said power transmission means further comprises drive pulley means provided in driving relationship on said internal combustion engine; a plurality of driven pulley means carried by said circular saw blades, respectively; and a drive belt engaging said drive pulley means and one of said driven pulley means for driving said driven pulleys and said circular saw blades, respectively.

17. Apparatus as recited in claim 12 wherein:

(a) said boom pivot is adapted to facilitate articulation of said operating boom with respect to said boom extension in a plane which extends substantially through the longitudinal axis of the helicopter; and (b) said power transmission means includes a drive pulley provided in driving relationship on said internal combustion engine; a plurality of driven pulleys carried by said circular saw blades, respectively; a plurality of connecting belts connecting said driven pulleys, respectively; and at least one drive belt engaging said drive pulley and one of said driven pulleys, for driving said said driven pulleys and said circular saw blades, respectively; and further comprising a quick-release hook carried by the helicopter for engaging said boom extension, said quick-release hook remotely controlled from the helicopter for selectively separating said boom extension from the helicopter and jettisoning said airborne tree trimming apparatus.

18. Apparatus as recited in claim 17 further comprising an idler pulley rotatably carried by said boom extension, said idler pulley provided substantially in alignment with said drive pulley; a drive pulley belt connecting said idler pulley and said drive pulley in driving relationship; a drive belt pulley carried by said boom extension, said drive belt pulley adapted for rotation with said idler pulley; and wherein said drive belt is connected to said drive belt pulley and said driven pulleys, whereby rotation of said drive pulley causes rotation of said idler pulley and said drive belt pulley and said driven pulleys, for driving said circular saw blades, respectively.

19. The apparatus as recited in claim 18 wherein said circular saw blades are each about two feet in diameter and further comprising governor means connected to said internal combustion engine in speed-sensing and speed-controlling relationship.

20. Airborne helicopter-mounted tree trimming apparatus for cutting trees and woody growth at selected altitudes, said apparatus comprising boom mounting structure attached to the underside of the helicopter near the center of lift thereof; a boom extension having one end pivotally mounted to said boom mounting structure about a pivot axis which is horizontal and transverse to the principal direction of flight of said helicopter, said boom extension being restrained from substantial rotation about its longitudinal axis; an operating boom having one end hingedly carried by the opposite end of said boom extension, said operating boom pivotable with respect to said boom extension in a plane which extends substantially through the longitudinal axis of the helicopter; a plurality of circular saw blades mounted on said operating boom for rotation about companion axes which are substantially parallel to said pivot axis, respectively, said circular saw blades arranged substantially in a common plane in spaced, tandem relationship; an internal combustion engine mounted on said operating boom between said opposite end of said boom extension and said circular saw blades; and flexible power transmission means connecting said circular saw blades and said internal combustion engine in driving relationship, whereby said circular saw blades engage and cut the woody growth beneath the helicopter along a flight path at the selected altitudes responsive to operation of said internal combustion engine.

21. Apparatus as recited in claim 20 further comprising a quick-release hook carried by said boom mounting structure and engaging said boom extension, said quick-release hook remotely controlled from the helicopter for selectively separating said boom extension from said boom mounting structure and jettisoning said airborne tree trimming apparatus.

22. Apparatus as recited in claim 21 further comprising a frame carried by said operating boom and wherein said internal combustion engine is mounted on said frame.

23. Apparatus as recited in claim 21 wherein said flexible power transmission means further comprises a drive pulley carried by the power output of said internal combustion engine; a pair of driven pulleys carried by each of said circular saw blades, respectively; a drive belt connecting said drive pulley to a selected one of said driven pulleys; and a plurality of connecting belts connecting said driven pulleys to each other.

24. Apparatus as recited in claim 23 further comprising an idler pulley rotatably carried by said boom extension, said idler pulley provided substantially in alignment with said drive pulley; a drive pulley belt connecting said idler pulley and said drive pulley in driving relationship; a drive belt pulley carried by said boom extension, said drive belt pulley adapted for rotation in concert with said idler pulley; and wherein said drive belt is connected to said drive belt pulley and said driven pulleys, whereby rotation of said drive pulley causes rotation of said idler pulley and said drive belt pulley and said driven pulleys, for driving said circular saw blades, respectively.

25. Apparatus as recited in claim 24 further comprising a clutch mounted on said drive pulley for selectively engaging and disengaging said drive pulley and controlling the rotation of said circular saw blades.

26. Apparatus as recited in claim 25 further comprising a governor connected to said internal combustion engine for monitoring and controlling the speed of said internal combustion engine.

27. Airborne helicopter-mounted tree trimming apparatus for use with a helicopter having a selected cargo lift capacity, said apparatus comprising boom mounting structure attached to the underside of said helicopter near the center of lift thereof: a first boom pivotally mounted to said boom mounting structure about a pivot axis which is horizontal and transverse to the principal direction of flight of said helicopter, said first boom being restrained from substantial rotation about its longitudinal axis: a second boom hingedly connected to the lower end of said first boom; a plurality of circular saw blades rotatably mounted in tandem relationship on said second boom for rotation about axes which are parallel to said pivot axis, said circular saw blades oriented substantially in a common plane; an internal combustion engine carried by said second boom; and power transmission means connecting said internal combustion engine to said circular saw blades for rotating said circular saw blades at a selected speed responsive to operation of said internal combustion engine.

28. Apparatus as recited in claim 27 further comprising a quick-release hook carried by said boom mounting structure and remotely controlled from the helicopter for selectively separating said first boom from the helicopter and jettisoning said airborne tree trimming apparatus.

29. Apparatus as recited in claim 28 wherein said flexible power transmission means further comprises a drive pulley carried by the power output of said internal combustion engine; a pair of driven pulleys carried by each of said circular saw blades in spaced, substantially aligned relationship, respectively; a cog tooth drive belt connecting said drive pulley to a selected one of said driven pulleys; and at least one V-belt connecting said driven pulleys to each other, respectively, for driving said driven pulleys and said circular saw blades responsive to operation of said internal combustion engine.

30. Apparatus as recited in claim 29 further comprising an idler pulley rotatably carried by said boom extension, said idler pulley provided substantially in alignment with said drive pulley; a drive pulley belt connecting said idler pulley and said drive pulley in driving relationship; a drive belt pulley carried by said boom extension, said drive belt pulley adapted for rotation in concert with said idler pulley; and wherein said drive belt is connected to said drive belt pulley and said driven pulleys, whereby rotation of said drive pulley causes rotation of said idler pulley and said drive belt pulley and said driven pulleys, for driving said circular saw blades, respectively.

31. Apparatus as recited in claim 30 further comprising a clutch mounted on said drive pulley for selectively engaging and disengaging said drive pulley and controlling the rotation of said circular saw blades.

32. Apparatus as recited in claim 31 further comprising a governor connected to said internal combustion engine for monitoring and controlling the speed of said internal combustion engine.

33. Apparatus as recited in claim 30 further comprising a pair of cradle supports provided on the ground in spaced relationship for receiving and supporting said tree-trimming apparatus.

* * * * *